United States Patent
Tetzlaff et al.

(10) Patent No.: US 9,353,752 B2
(45) Date of Patent: May 31, 2016

(54) COMPLIANT ABRASION RESISTANT BEARINGS FOR A SUBMERSIBLE WELL PUMP

(71) Applicant: Baker Hughes Incorporated, Houston, TX (US)

(72) Inventors: Steven K. Tetzlaff, Owasso, OK (US); Dan L. Adams, Claremore, OK (US); Dewayne May, Broken Arrow, OK (US)

(73) Assignee: Baker Hughes Incorporated, Houston, TX (US)

( * ) Notice: Subject to any disclaimer, the term of this patent is extended or adjusted under 35 U.S.C. 154(b) by 322 days.

(21) Appl. No.: 13/946,651

(22) Filed: Jul. 19, 2013

(65) Prior Publication Data

US 2015/0023815 A1    Jan. 22, 2015

(51) Int. Cl.
*F04D 1/04* (2006.01)
*F04D 13/10* (2006.01)
*F04D 29/041* (2006.01)
*E21B 4/00* (2006.01)

(52) U.S. Cl.
CPC ........ *F04D 1/04* (2013.01); *F04D 13/10* (2013.01); *F04D 29/0413* (2013.01); *E21B 4/003* (2013.01); *F16C 2360/44* (2013.01)

(58) Field of Classification Search
CPC .............. F04D 13/08–13/086; F04D 25/0686; F04D 29/04–29/059; F16C 17/04; F16C 17/10; F16C 17/14; F16C 43/02

USPC ................. 417/423.3, 423.12, 424.2
See application file for complete search history.

(56) References Cited

U.S. PATENT DOCUMENTS

| | | | | |
|---|---|---|---|---|
| 1,349,157 | A | * | 8/1920 | Kingsbury .................... 384/125 |
| 3,062,598 | A | * | 11/1962 | Summers ...................... 384/308 |
| 7,575,413 | B2 | | 8/2009 | Semple et al. |
| 7,987,913 | B2 | | 8/2011 | Parmeter et al. |
| 8,419,284 | B2 | * | 4/2013 | Blair et al. .................... 384/121 |
| 2012/0257998 | A1 | * | 10/2012 | Parmeter et al. ......... 417/423.13 |
| 2012/0263610 | A1 | | 10/2012 | Tetzlaff et al. |
| 2013/0121808 | A1 | * | 5/2013 | Ahrens et al. ................. 415/104 |
| 2013/0315517 | A1 | * | 11/2013 | Tetzlaff et al. ................ 384/226 |

* cited by examiner

*Primary Examiner* — Nathan J Newhouse
*Assistant Examiner* — Thomas Cash
(74) *Attorney, Agent, or Firm* — Bracewell LLP

(57) ABSTRACT

An electrical submersible pump assembly includes a centrifugal pump having impellers and diffusers. A thrust runner is coupled to a motor shaft for rotation along with the impellers. The runner receives thrust from at least one of the impellers and transfers the thrust to a bushing non rotatably mounted in one of the diffusers. The bushing has a thrust transferring end adjacent a thrust receiving shoulder in the diffuser. The bushing is axially movable in the receptacle. An annular spring located between the thrust receiving shoulder in the receptacle and the thrust transferring end of the bushing urges the bushing away from the thrust receiving shoulder.

16 Claims, 4 Drawing Sheets

COMPLIANT ABRASION RESISTANT BEARINGS FOR A SUBMERSIBLE WELL PUMP

FIELD OF THE DISCLOSURE

This disclosure relates in general to electrical submersible pumps for wells and in particular to centrifugal pump stage bearings having axial and radial compliance.

BACKGROUND

Electrical submersible pumps (ESP) are widely used to pump oil production wells. A typical ESP has a rotary pump driven by an electrical motor. A seal section is located between the pump and the motor to reduce the differential between the well fluid pressure on the exterior of the motor and the lubricant pressure within the motor. A drive shaft, normally in several sections, extends from the motor through the seal section and into the pump for rotating the pump. The pump may be a centrifugal pump having a large number of stages, each stage having an impeller and diffuser.

During operation, the impellers create thrust, which can be both in downward and upward directions. The impellers transmit the thrust in various manners to the diffusers. Some pumps are particularly used in abrasive fluid environments. In those pumps, a thrust runner is coupled to the shaft to receive thrust from one or more impellers. A bushing secured into a receptacle in the diffuser receives the thrust and transfers the thrust to the diffuser. The thrust runner and the bushing may be formed of an abrasion resistant material, such as tungsten carbide, that is harder than the material of the diffuser. The bushing is commonly installed in the receptacle with a press fit.

Damage and misalignment may occur When the hard bashing is press fit into the diffuser. The wear resistant bushing may misalign slightly when pressed into the diffuser receptacle. During operation, load concentrations may occur, causing the carbide material to crack or chip. Some pumps tend to vibrate, particularly at higher fluid flow pressures, and the vibration can lead to carbide chattering. The bearing surfaces are subject to intermittent loading due to gas slugging fluid production, creating shock. Heat is generated by the bearing surfaces, which can cause damage to the bearings.

SUMMARY

An electrical submersible pump assembly has a plurality of modules, including a rotary pump module, a motor module, and a seal section module located between the motor module and the pump module. A bearing in at least one of the modules has a sleeve coupled to a drive shaft for rotation therewith, the sleeve being subject to axial thrust and having an axially facing thrust transferring surface. A bushing has a bore that receives the sleeve in sliding, rotational engagement. The bushing has an axially facing thrust surface for engagement by the thrust transferring surface of the sleeve. The bushing has an axially facing thrust transferring surface facing in an opposite direction to the thrust receiving surface of the bushing.

A stationarily mounted supporting member has a receptacle that receives the bushing. The supporting member is of less hardness than the bushing and has an axially facing thrust receiving shoulder. The bushing is axially movable a limited extent relative to the supporting member. A spring is located between and in engagement with the thrust transferring surface of the bushing and the thrust receiving shoulder of the receptacle. The spring biases the bushing axially in a direction opposite to the thrust.

At least one axially extending pin extends between the supporting member and the bushing for preventing rotation of the bushing relative to the supporting member. The pin preferably extends from the thrust receiving shoulder of the supporting member and fits into mating profile in the bushing. The mating profile may be defined by at least one axially extending groove or recess on an outer wall of the bushing and at least one axially extending groove or recess on an inner diameter of the receptacle. The grooves align to define the profiles for the pins.

The spring is an annular member having an axis that coincides with the axis of the shalf. Preferably, the spring is a metal wavy spring.

In the embodiment shown, the sleeve has a cylindrical body having first and second ends. An external flange extends radially from the body with the thrust transferring surface on one side of the flange. A helical coolant groove is formed on an outer surface of the body, the coolant groove having a first end at the thrust transferring surface and a second end at the second end of the body. A coolant port may extend through the flange in communication with the helical coolant groove.

Further, at least one axially extending coolant groove may be formed in an inner diameter of the bore of the bushing. At least one radially extending coolant groove may be located on the thrust receiving surface of the bushing.

DETAILED DESCRIPTION OF THE DISCLOSURE

Figure 1:
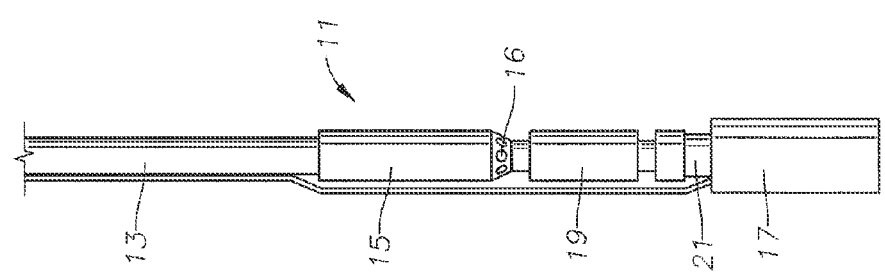
FIG. 1 is a side view of an electrical submersible pump assembly in accordance with this disclosure.

Referring to FIG. 1, electrical submersible pump assembly (ESP) 11 is illustrated as being supported on production tubing 13 extending into a well. Alternately, ESP 11 could be supported by other structure, such as coiled tubing. ESP 11 includes several modules, one of which is a rotary pump 15 that is illustrated as being a centrifugal pump. Pump 15 has an intake 16 for drawing in well fluid. Alternately, pump 15 could be other types, such as a progressing cavity pump. Another module is an electrical motor 17, which drives pump 15 and is normally a three-phase AC motor. A third module comprises a protective member or seal section 19 coupled between pump 15 and motor 17. Seal section 19 has components to reduce a pressure differential between dielectric lubricant contained in motor 17 and the pressure of the well fluid on the exterior of ESP 11. Intake 16 may be located in an upper portion of seal section 19 or on a lower end of pump 15. A thrust bearing 21 for motor 17 may be in a separate module or located in seal section 19 or motor 17.

ESP 11 may also include other modules, such as a gas separator for separating gas from the well fluid prior to the well fluid flowing into pump 15. The various modules may be shipped to a well site apart from each other, then assembled with bolts or other types of fasteners.

Figure 2:
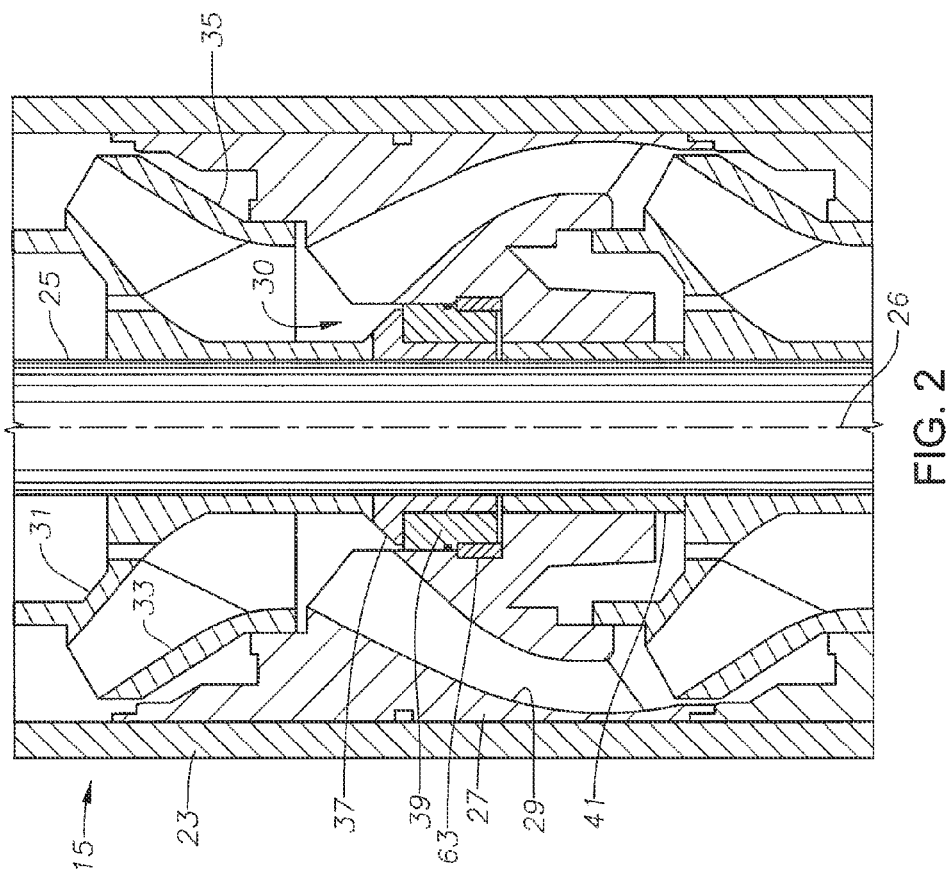
FIG. 2 is a se new of a portion of the pump of the pump assembly of FIG. 1.

Referring to FIG. 2, pump 15 includes a housing 23 that is cylindrical and much longer than its diameter. A drive shaft 25 extends along longitudinal axis 26 through housing 23 and is rotated by motor 17. Shaft 25 is normally made up of several sections connected together with splined ends. A large number of stages are normally within housing 23, each stage including a stationary diffuser 27. Diffusers 27 are stacked on one another and secured against rotation in housing 23. Diffusers 27 have flow passages 29 leading upward and inward toward axis 26. An impeller 31 is rotatably located within a central receptacle 30 of each diffuser 27. Impellers 31 have flow passages 33 that lead from a central area upward and outward from axis 26. The terms "downward" and "upward" are used only for convenience, since pump 15 is not always oriented vertically as shown. The example of FIG. 2 is a mixed flow type, wherein the flow passages 29, 33 extend both axially as well as radially. Alternately, pump 15 could be a radial flow type Wherein the flow passages extend primarily radially and not axially.

FIG. 2 illustrates how thrust imposed on each impeller 31 is transferred to one of the diffusers 27, which serves as a supporting member. When pump 15 is pumping fluid, the thrust is considered to be in a downward direction away from the direction the fluid is being pumped. Upward directed thrust can also occur, such as during startup. Each impeller 31 has a hub 35, which is a cylindrical member having a bore through which shaft 25 passes. In this example, a thrust runner or sleeve 37 is located below hub 35. The lower end of hub 35 abuts an upper end. of thrust runner 37. Alternately, a spacer sleeve (not shown) could be located between thrust runner 37 and hub 35. Also, rather than being separate as shown, hub 35 and thrust runner 37 could be integrally formed together. Further, thrust runners 37 could be employed with only part of the impellers 31, rather than all, as shown, That is, hubs 35 could transfer thrust from one impeller 31 to another impeller 31 and eventually to thrust runner 37. Thrust runner 37 may be of a harder material than the material of impeller hub 35, such as tungsten carbide.

Thrust runner 37 seats in a thrust bushing 39, which in turn is nonrotatably supported in diffuser receptacle 30. Bushing 39 may also be of a harder material such as tungsten carbide, than the material of impeller hub 35 and diffuser 27. Runner 37 is secured to shaft 25 for rotation but is free to move a limited amount axially relative to shaft 25. Typically a key (not shown) engages mating axially extending grooves 43 (FIG. 3) in runner 37 and shaft 25. A spacer sleeve 41 may be surrounding shaft 25 and extending downward from thrust runner 37 to the impeller 31 located below. Thrust runner 37 transfers downthrust due to the pumping action of impellers 31. An upthrust assembly (not shown) including another thrust runner and bushing could be mounted to diffuser 27 below and inverted from thrust runner 37 and bushing 39 for transmitting upthrust to diffuser 27.

Figure 3:
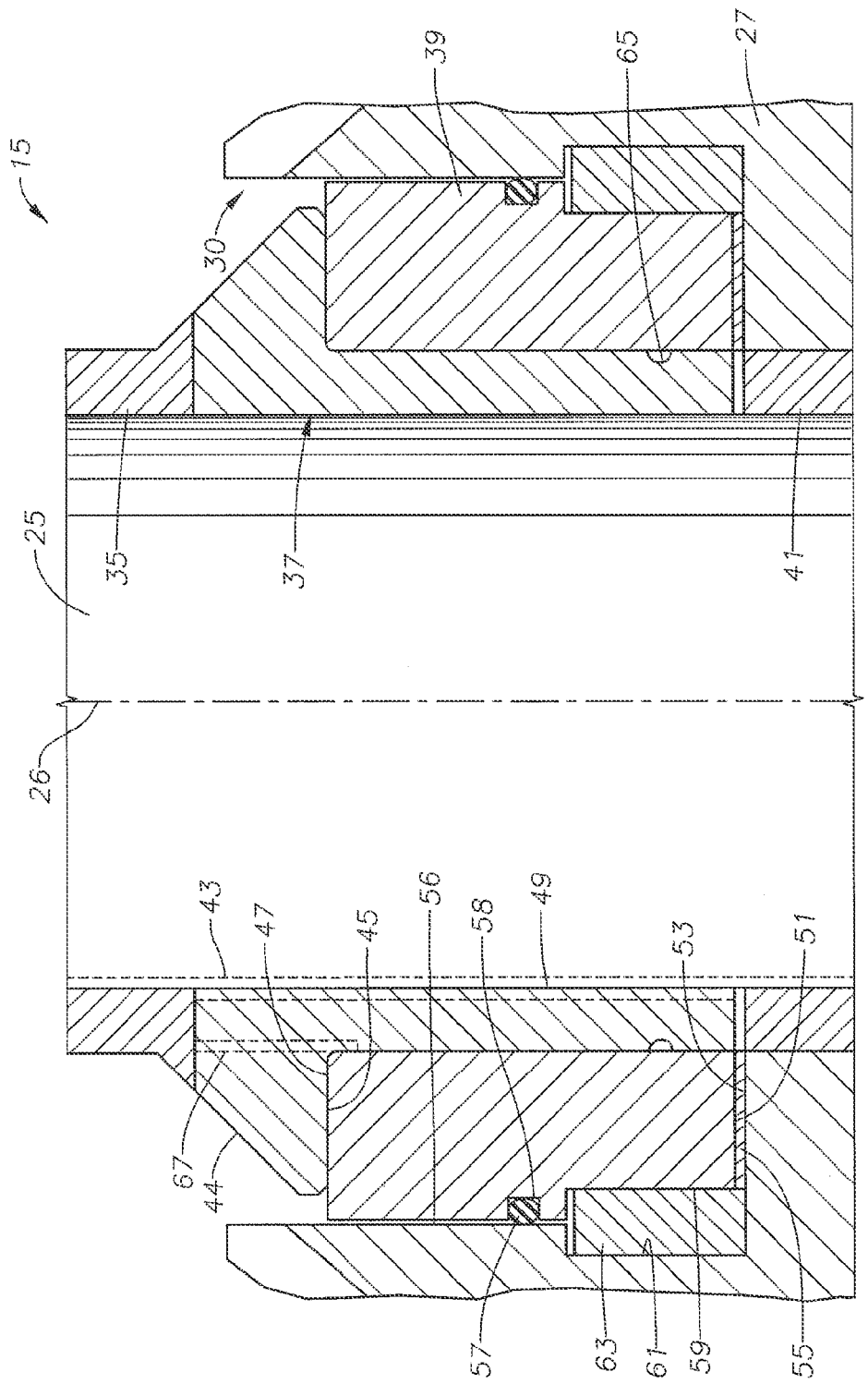
FIG. 3 is an enlarged sectional view of one of the thrust runners and bushings of the pump of FIG. 2 and shown installed in a diffuser.

Referring to FIG. 3, thrust runner 37 has a radially extending flange 44 on its upper end. The upper side of flange 44 may be conical, with the maximum diameter at the lower edge of flange 44. Flange 44 has on its lower side a thrust transferring face 45 that is in a plane perpendicular to axis 26 and faces in a downward direction. Thrust transferring face 45 engages a thrust receiving surface 47 of bushing 19 in rotating sliding contact. Thrust runner 37 has a cylindrical body 49 that extends downward from thrust transferring face 45 and has a smaller outer diameter than flange 44.

Figure 7:
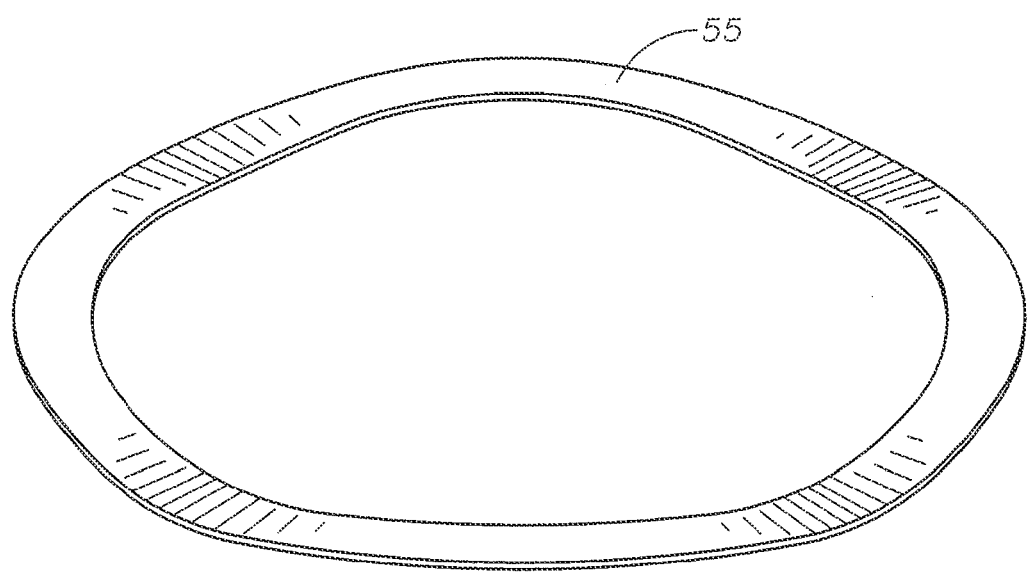
FIG. 7 is an isometric view of the spring employed with the bushing of FIG. 3.

Bushing 39 has a cylindrical body with a thrust transferring surface 51 on its lower end. Bushing thrust transferring surface 51 transfers thrust to a diffuser thrust receiving shoulder 53 formed in receptacle 30. A spring 55 is positioned between bushing thrust transferring surface 51 and diffuser thrust receiving shoulder 53. Spring 55 is a resilient annular member encircling shaft 25. In the embodiment shown, the inner diameter of spring 55 is flush with the inner diameter of receptacle thrust receiving shoulder 53. The outer diameter of spring 55 is illustrated as being less than the outer diameter of thrust receiving shoulder 53, but it could be the same. Preferably, spring 55 is metal and may be a wavy spring having undulations as shown in FIG. 7. Spring 55 exerts an upward force on bushing 39, and downthrust causes spring 55 to deflect, allowing bushing 39 to move downward. The amount of axial movement of bushing 39 relative to diffuser 27 may vary, but is preferably at least equal to the maximum deflection of spring 55 from its undeflected position.

Bushing 39 has an outer diameter that is slightly less than the inner diameter of the cylindrical section 56 of receptacle 30 extending upward from thrust receiving shoulder 53. The annular clearance between cylindrical section 56 and the outer diameter of bushing 39 may vary, for example, between about 0.020 inch to 0.100 inch on a side. This annular clearance allows slight radial movement of bushing 39 as well as axial movement relative to diffuser 27. Optionally, a split retainer ring (not shown) may be snapped into an annular groove in diffuser cylindrical section 56 above the upper end of bushing 39 to limit upward movement of bushing 39 from diffuser receptacle thrust receiving shoulder 53.

An elastomeric ring 57 may be in the annular clearance between bushing 39 and cylindrical section 56. Elastomeric ring 57 dampens radial movement of bushing 39 relative to diffuser 27. Elastomeric ring 57 may be an O-ring, and it is illustrated as being located in an annular groove 58 on the outer diameter of bushing 39. Elastomeric ring 57 also forms a seal between bushing 39 and receptacle cylindrical section 56.

Figure 4:
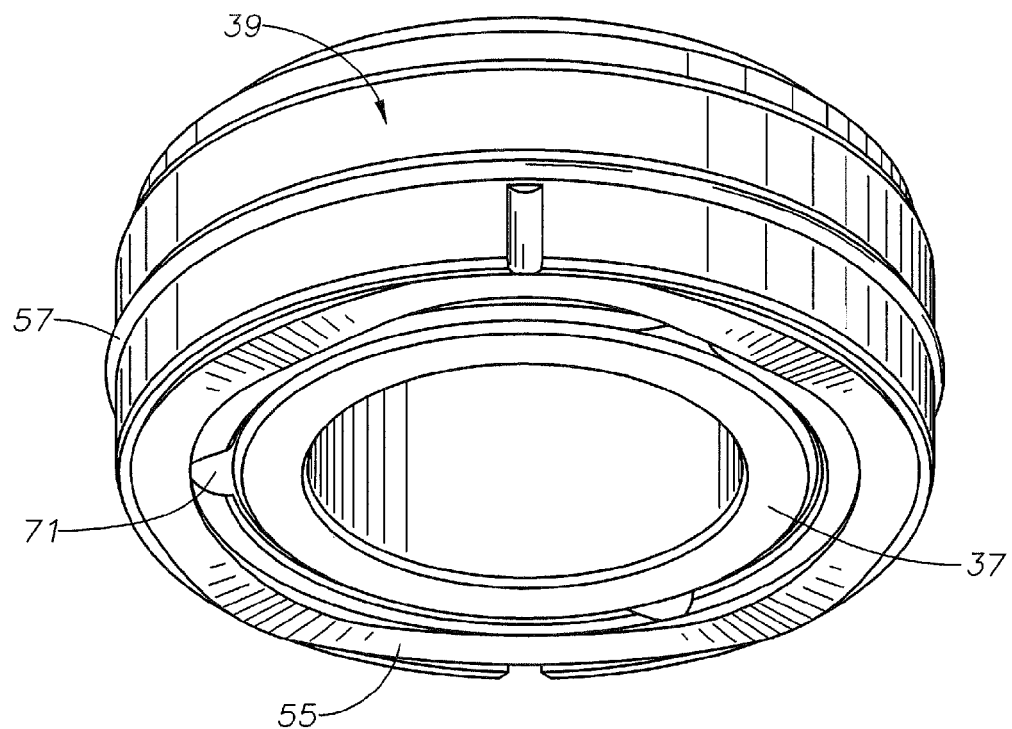
FIG. 4 is an assembled isometric view of the thrust runner and bushing shown in FIG. 3.

An anti-rotation means is required to prevent bushing 39 from rotating relative to diffuser 27. In this embodiment, several axially extending grooves or profiles 59 are formed in the outer diameter of bushing 39, as shown also in FIGS. 4 and 6. Bushing axially extending grooves 59 are semi-cylindrical and extend from the lower end of bushing 39 upward to a point just below annular groove 58, which holds elastomeric ring 57. Diffuser receptacle 30 has mating axial grooves or profiles 61 formed in cylindrical section 56. Diffuser axial grooves 61 are semi-cylindrical recesses extending upward from diffuser thrust receiving shoulder 53 to the same distance as bushing axial grooves 59. Diffuser axial grooves 61 are of the same diameter as bushing axial grooves 59 and circumferentially spaced from each other the same distance. When bushing axial grooves 59 align with diffuser axial grooves 61, they create cylindrical holes or profiles. A pin 63 is located in each hole, thereby preventing bushing 39 from rotating relative to diffuser 27. Each pin 63 is slightly smaller in diameter than the cylindrical hole provided by mating axial grooves 59, 61 so as to allow bushing 39 to move axially a limited amount relative to diffuser 27. The lower ends of pins 63 are shown as abutting receptacle thrust receiving shoulder 53 outward from wavy spring 55.

Figure 5:
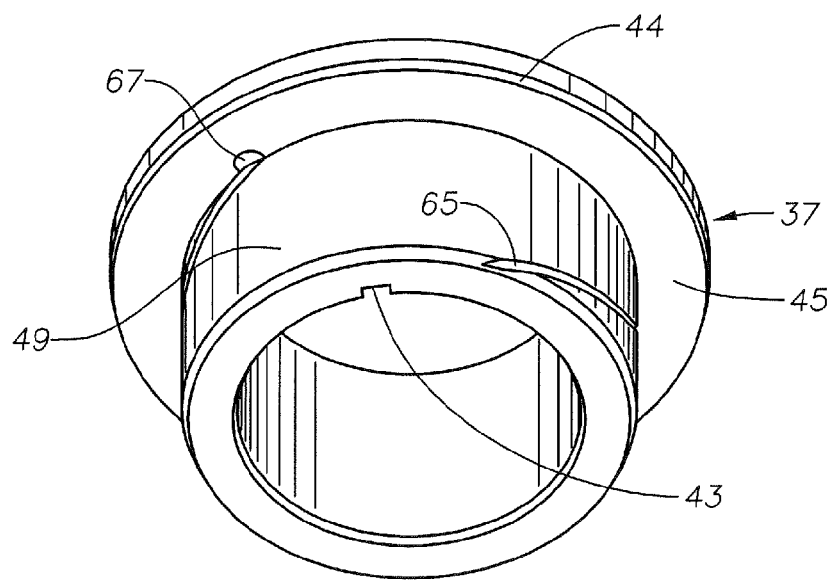
FIG. 5 is an isometric view of the thrust runner of FIG. 3.

Referring to FIG. 5, in this example, thrust runner 37 has a helical groove 65 formed on the outer diameter of its body 49. Helical groove 65 has a lower end or termination at the lower end of body 49 and an upper termination at the upper end of body 49 at flange 44. Helical groove 65 may make a single turn around runner body 49, as shown, or more than one turn. A small weep hole or coolant port 67 may extend from the upper termination of helical groove 65. through runner flange 44 from thrust transmitting face 45 to the upper side of flange 44, as illustrated by the dotted lines in FIG. 3. Coolant port 67 may extend axially or it may incline relative to axis 26. Helical groove 65 and coolant port 67 define a continuous flow passage for coolant fluid, namely a small portion of the well fluid being pumped. Some of the upward flowing well fluid diverts up helical groove 65 and out coolant port 67, cooling the interface between thrust runner 37 and bushing 39.

Figure 6:
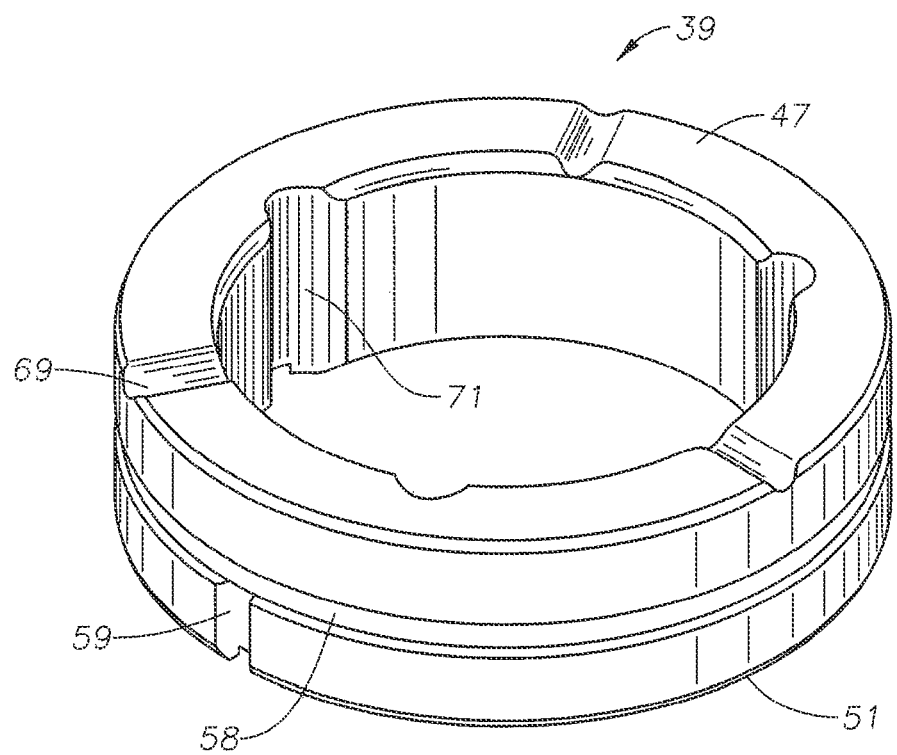
FIG. 6 is an isometric view of the bushing of FIG. 3.

In the preferred embodiment, bushing 39 also has coolant passages, as illustrated in FIG. 6. These passages include radially extending grooves 69 on the thrust receiving surface 47 of bushing 39. Bushing radial grooves 69 define flow passages between thrust receiving surface 47 and runner thrust transferring face 45. Bushing 39 also has axial coolant grooves 71 in its inner diameter. Each axial coolant groove 47 extends parallel to axis 26 from the lower end of bushing 39 to bushing thrust receiving surface 47. Bushing axial coolant grooves 47 define coolant flow passages between runner body 49 and the inner diameter of bushing 39.

Referring to FIG. 2, pump is assembled stage by stage on shaft 25, then inserted into housing 23. When a stage having one of the thrust tiers 37 is assembled, wavy spring 55 will be placed on diffuser thrust receiving shoulder 53. Elastomeric ring 57 is installed on bushing 39. Pins 63 will be placed in diffuser axial grooves 61, then bushing 39 will be oriented so that bushing axial grooves 59 align with pins 63. Bushing 39 is then pushed into receptacle cylindrical section 56, and bushing axial grooves 59 will slide over pins 63. Thrust runner 37 may be installed in bushing 39 before or after bushing 39 is pushed into place in diffuser receptacle 30.

During operation, motor 17 (FIG. 1) rotates shaft 25, causing impellers 31 to rotate. Well fluid flows up diffuser passages 29 and impeller passages 33. Referring to FIGS. 5 and 6, some of the well fluid diverts through bushing axial coolant grooves 71 and radially out through bushing radial coolant grooves 69. Some of the well fluid diverts through runner helical groove 65 and runner coolant port 67. As runner 37 rotates, some of the fluid flowing up bushing axial coolant grooves 71 enters runner helical groove 65. Further, as runner 37 rotates, some of the fluid flowing radially out bushing radial coolant grooves 69 communicates with the upper termination with runner helical groove 65 and with the lower end of runner coolant port 67.

The downward thrust imposed on impellers 37 transfers via runner thrust transferring face 45 to bushing thrust receiving surface 47. The thrust transfers from bushing thrust transferring surface 51 through spring 55 to diffuser receptacle thrust receiving shoulder 53. The downthrust may be sufficiently high at times to completely deflect spring 55, which pushes bushing 39 to its lowermost position. Spring 55 biases bushing 39 upward and allows bushing 39 to move axially upward relative to diffuser 27 a limited amount if the downthrust drops, even if momentarily. The amount of upward movement of bushing 39 could be equal to the axial dimension of spring 55 from its fully deflected condition to its undeflected condition. This axial movement of bushing 39 reduces damage due to the bearing surfaces of runner 37 and bushing 39. The axial compliant movement of bushing 39 reduces damage from chattering that results from gas contained in the well fluid.

While the disclosure has been shown in only one of its forms, it should be apparent to those skilled in the art that it is not so limited but is susceptible to various changes without departing from the scope of the disclosure. For example, although shown only in connection with a pump stages, the axially and radially complaint bushing could also be employed with shaft bearings in the pump, seal section, motor, and gas separator, if used.

The invention claimed is:

1. An electrical submersible pump assembly, comprising:
   a plurality of modules, including a rotary pump module, a motor module, and a seal section module located between the motor module and the pump module;
   the rotary pump module comprising a centrifugal pump having a driven shaft, a plurality of stages, each of the stages having an impeller and a diffuser, the impeller of each of the stages coupled to the shaft for rotation therewith,
   at least one of the stages further comprising:
   a thrust runner coupled to the drive shaft for rotation therewith, the thrust runner having a thrust receiving end that receives axial thrust from the impeller and having an axially facing thrust transferring surface;
   a bushing having a bore that receives the thrust runner in sliding, rotational engagement, the bushing having an axially facing thrust receiving surface in sliding, rotational engagement with the thrust transferring surface of the thrust runner, the bushing having an axially facing thrust transferring surface facing in an opposite direction to the thrust receiving surface of the bushing;
   the diffuser having a receptacle that receives the bushing, the diffuser being of less hardness than the bushing, the receptacle having an axially facing thrust receiving shoulder;
   the bushing being axially movable a limited extent relative to the receptacle;
   at least one axially extending semi-cylindrical recess formed in a cylindrical inner wall of the receptacle;
   an anti-rotation member in engagement with a cylindrical outer wall of the bushing and having an outer portion located within the recess to prevent rotation of the bushing relative to the receptacle; and
   an annular elastomeric seal between the outer wall of the bushing and the inner wall of the receptacle.

2. The pump assembly according to claim 1, wherein:
   the seal is spaced axially from the recess.

3. The pump assembly according to claim 1, wherein:
   the recess is open at the thrust transferring surface of the bushing and has a closed end spaced axially from the seal.

4. The pump assembly according to claim 1, further comprising:
   a spring located between and in engagement with the thrust transferring surface of the bushing and the thrust receiving shoulder of the receptacle, the spring biasing the bushing axially in a direction opposite to the thrust; and
   wherein the spring is an annular member having an axis that coincides with the axis of the shaft and having an outer diameter a smaller radial distance from the axis than a radial distance from the axis to the outer portion of the anti-rotation member.

5. The pump assembly according to claim 1, further comprising:
   a spring located between and in engagement with the thrust transferring surface of the bushing and the thrust receiving shoulder of the receptacle, the spring biasing the bushing axially in a direction opposite to the thrust;
   wherein the spring is a metal annular member having an axis that coincides with the axis of the shaft; and the anti-rotation member has an end that abuts the thrust receiving shoulder of the receptacle radially outward from the spring.

6. The pump assembly according to claim 5, wherein the spring is a metal wavy spring.

7. The pump assembly according to claim 1, wherein the sleeve comprises:
a cylindrical body having first and second ends;
an external flange extending radially from the body with the thrust transferring surface on one side of the flange, the flange having an outer diameter;
a helical coolant groove formed on an outer surface of the body, the helical coolant groove having a first end at the thrust transferring surface and a second end at the second end of the body; and
a flange flow port extending through the flange from the thrust transferring surface to a side of the flange opposite the thrust transferring surface, the flange flow port being radially inward from the outer diameter of the flange, the flange flow port being in fluid communication with the first end of the helical coolant groove to allow fluid flow through the helical coolant groove and the flange flow port.

8. An electrical submersible pump assembly, comprising:
a centrifugal pump having a plurality of stages, each of the stages having an impeller and a diffuser, and a driven shaft that rotates the impellers;
an electrical motor that rotates the driven shaft;
a seal section coupled between the pump and the motor for reducing a pressure differential between lubricant in the motor and well fluid on an exterior of the motor;
at least one of the stages comprising:
a thrust runner coupled to the shaft for rotation therewith, the runner having a thrust transferring face transverse to an axis of the shaft and a body with a cylindrical exterior, the runner having a thrust receiving end positioned to receive thrust from the impeller of said at least one of the stages;
a receptacle in the diffuser having a thrust receiving shoulder and a cylindrical inner wall;
a bushing non rotatably mounted in the receptacle, the bushing having a bore that receives the body of the runner in sliding, rotating engagement, the bushing having a thrust receiving end engaged by the thrust transferring face in rotating, sliding engagement to transfer thrust from the runner to the bushing, the bushing having a thrust transferring end adjacent the thrust receiving shoulder, the bushing having a cylindrical outer wall closely received within the inner wall of the receptacle, the bushing being axially movable in the receptacle a limited extent;
an elastomeric seal between the outer wall of the bushing and the inner wall of the receptacle;
a semi-cylindrical axially extending recess in the inner wall of the receptacle;
an anti-rotation member in engagement with the outer wall of the bushing and having an outer portion located in the recess; and
an annular spring located between the thrust receiving shoulder in the receptacle and the thrust transferring end of the bushing for urging the bushing away from the thrust receiving shoulder in the receptacle, the outer portion of the anti-rotation member being radially farther from the axis than an outer diameter of the annular spring.

9. The pump assembly according to claim 8, wherein:
the anti-rotation member is below the seal.

10. The pump assembly according to claim 8, wherein the spring is a metal wavy spring.

11. The pump assembly according to claim 8, wherein the runner comprises:
an external flange extending radially from the body with the thrust transferring face on one side of the flange, the flange having an outer diameter greater than an outer diameter of the cylindrical exterior of the body;
a helical coolant groove formed on the cylindrical exterior of the body, the helical coolant groove having a first end terminating at the thrust transferring face and a second end terminating at an end of the body opposite the flange; and
a flange flow port extending through the flange and registering with the first end of the helical coolant groove, the flow port extending from the thrust transferring surface of the flange upward to a surface of the flange opposite the thrust transferring surface of the flange at a point radially inward from the outer diameter of the flange, to allow fluid within the pump to flow through the helical coolant groove and the flange flow port.

12. An electrical submersible pump assembly, comprising:
a centrifugal pump having a plurality of stages, each of the stages having an impeller and a diffuser, and a driven shaft that rotates the impellers, the shaft having an axis;
an electrical motor that rotates the driven shaft;
a seal section coupled between the pump and the motor for reducing a pressure differential between lubricant in the motor and well fluid on an exterior of the motor;
at least one of the stages comprising:
a receptacle formed in the diffuser of said at least one of the stages;
a thrust runner coupled to the shaft for rotation therewith, the runner having a body with a cylindrical exterior, an upward facing thrust receiving end on the body in engagement with the impeller of said one of the stages, and a flange extending radially outward from the body and having a downward facing thrust transferring face, the flange having an outer diameter greater than the cylindrical exterior of the body;
a bushing having a bore that receives the cylindrical exterior of the body of the runner in sliding, rotating engagement, the bushing having an upward facing thrust receiving surface engaged by the thrust transferring face in rotating, sliding engagement to transfer thrust from the runner to the bushing, the bushing being located in the receptacle and having a downward facing thrust transferring surface that transfers thrust to the diffuser;
the runner and the bushing each having a greater hardness than the diffuser;
a helical coolant groove formed on the cylindrical exterior of the body of the runner, the helical coolant groove having an upper end terminating at the thrust transferring face of the flange and a lower end terminating at lower end of the body; and
a flange flow port extending through the flange radially inward from the outer diameter of the flange, the flange flow port having a lower end registering with the upper end of the helical coolant groove and an upper end at an upper end of the flange to allow fluid within the pump to flow through the helical coolant groove and the flange flow port.

13. The pump assembly according to claim 12, further comprising:
a plurality of radially extending coolant grooves on the thrust receiving surface of the bushing; and a plurality of axially extending coolant grooves foimed in an inner diameter of the bore of the bushing.

14. The pump assembly according to claim 12, wherein the flange flow port extends parallel with the axis.

15. The pump assembly according to claim 12, wherein:
the bushing is axially movable a limited extent in the receptacle; and the assembly further comprises:
an annular seal between an outer diameter surface of the bushing and an inner diameter surface of the receptacle;
a semi-cylindrical axially extending recess formed in the inner diameter surface of the receptacle;
an anti-rotation member in engagement with the bushing and having an outer portion located in the recess to prevent rotation of the bushing in the receptacle; and
a wavy spring between the downward facing thrust transferring surface of the bushing and a thrust receiving shoulder in the receptacle for urging the bushing upward relative to the diffuser.

16. The pump assembly according to claim 15, wherein:
the anti-rotation member is axially spaced from the seal, and the outer portion of the anti-rotation member is radially farther from the axis than an outer diameter of the wavy spring.

\* \* \* \* \*